(12) United States Patent
Yasuda et al.

(10) Patent No.: US 11,455,744 B2
(45) Date of Patent: Sep. 27, 2022

(54) SYSTEMS AND METHODS FOR DETERMINING A VIEWING DIRECTION OF A USER

(71) Applicant: Toyota Research Institute, Inc., Los Altos, CA (US)

(72) Inventors: Hiroshi Yasuda, San Francisco, CA (US); Alexander Russell Green, Redwood City, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 233 days.

(21) Appl. No.: 16/784,983

(22) Filed: Feb. 7, 2020

(65) Prior Publication Data

US 2021/0248775 A1 Aug. 12, 2021

(51) Int. Cl.
*G06K 9/00* (2022.01)
*G06T 7/73* (2017.01)

(52) U.S. Cl.
CPC ...... *G06T 7/73* (2017.01); *G06T 2207/10048* (2013.01); *G06T 2207/30201* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 8,447,072 B2 | 5/2013 | Takahashi et al. | |
| 9,296,338 B2 | 3/2016 | Kaplan et al. | |
| 9,586,550 B2 | 3/2017 | Kuehne et al. | |
| 10,040,350 B2 | 8/2018 | Dias et al. | |
| 10,248,192 B2 | 4/2019 | Lehman et al. | |
| 2013/0002846 A1* | 1/2013 | De Bruijn | G06F 3/147 348/78 |
| 2015/0124068 A1* | 5/2015 | Madau | G06V 10/147 29/428 |
| 2015/0234952 A1 | 8/2015 | Kruse et al. | |
| 2016/0101734 A1* | 4/2016 | Baek | B60R 11/04 348/148 |
| 2017/0187963 A1* | 6/2017 | Lee | H04N 5/23218 |
| 2018/0032300 A1 | 2/2018 | Singh et al. | |
| 2018/0086339 A1* | 3/2018 | Hanna | G06K 9/00604 |
| 2018/0218545 A1 | 8/2018 | Garcia et al. | |
| 2021/0003851 A1* | 1/2021 | Seder | G02B 27/0179 |
| 2021/0080727 A1* | 3/2021 | Yamada | G02B 27/0172 |

* cited by examiner

*Primary Examiner* — Sean M Conner
(74) *Attorney, Agent, or Firm* — Dinsmore & Shohl LLP

(57) ABSTRACT

Vehicles and systems and methods for determining a viewing direction of a user are disclosed. In one embodiment, a system for detecting a viewing direction of a user includes a marker arranged at a fixed location, and an optical assembly. The optical assembly includes a first optical sensor arranged to view the marker, and a second optical sensor arranged to view the user. The first optical sensor detects the marker for determining a spatial location of the optical assembly with respect to the marker, and the second optical sensor detects an eye of the user for determining an eye angle of the user.

16 Claims, 5 Drawing Sheets

SYSTEMS AND METHODS FOR DETERMINING A VIEWING DIRECTION OF A USER

TECHNICAL FIELD

The present specification generally relates to eye tracking, and, more specifically, to systems and methods for detecting a viewing direction of a user, such as the driver of a vehicle.

BACKGROUND

Driver monitoring systems may employ an eye tracking device that tracks the gaze of a driver by monitoring an eye angle of the driver. However, current driver monitoring systems cannot accurately determine a viewing direction of a user because the position and orientation of the driver's head in three-dimensional space is unknown. Thus, current driver monitoring systems cannot accurately determine if a driver has viewed an object in the environment.

Accordingly, there is a need for alternative driver monitoring systems and methods that can determine the viewing direction of a user.

SUMMARY

In one embodiment, a system for detecting a viewing direction of a user includes a marker arranged at a fixed location and an optical assembly. The optical assembly includes a first optical sensor arranged to view the marker and a second optical sensor arranged to view the user. The first optical sensor detects the marker for determining a spatial location of the optical assembly with respect to the marker, and the second optical sensor detects an eye of the user for determining an eye angle of the user.

In another embodiment, a system for detecting a viewing direction of a user within a vehicle includes a marker configured to be arranged within the vehicle at a fixed location proximate a windshield, wherein the marker is invisible to the user, and an optical assembly configured to be arranged over the eyes of the user. The optical assembly includes a first optical sensor arranged to view the marker and a second optical sensor arranged to view the user. The system further includes a processor and a non-transitory computer-readable medium storing computer-readable instructions, that, when executed by the processor, cause the processor to: receive first data from the first optical sensor, wherein the first data includes a representation of the marker, receive second data from the second optical sensor, wherein the second data includes a representation of an eye of the user, determine a spatial location of the optical assembly with respect to the marker from the first data, determine an eye angle of the eye of the user from the second data, and determine a viewing direction of the user from the spatial location of the optical assembly and the eye angle of the eye of the user.

In another embodiment, a vehicle includes a windshield, a marker arranged within the vehicle such that it is viewable on the windshield, and an optical assembly configured to be arranged on a head of a user. The optical assembly includes a first optical sensor arranged to view the marker, and a second optical sensor arranged to view an eye of the user. The system further includes a processor and a non-transitory computer-readable medium storing computer-readable instructions, that, when executed by the processor, cause the processor to: receive first data from the first optical sensor, wherein the first data includes a representation of the marker, receive second data from the second optical sensor, wherein the second data includes a representation of the eye of the user, determine a spatial location of the optical assembly with respect to the marker from the first data, determine an eye angle of the eye of the user from the second data, and determine a viewing direction of the user from the spatial location of the optical assembly and the eye angle of the eye of the user.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
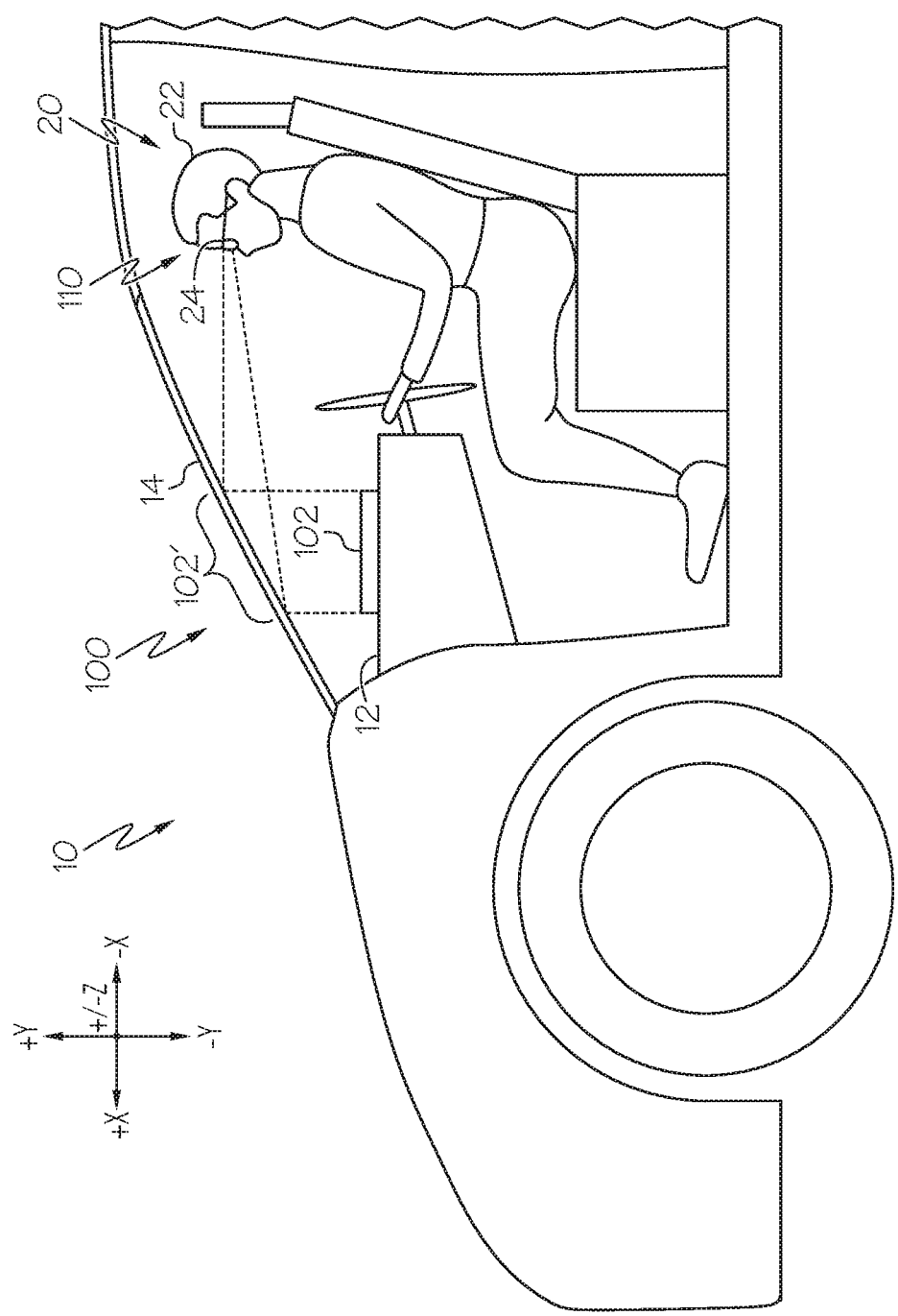
FIG. 1 schematically depicts an example vehicle including an example system for determining a viewing direction of a user according to one or more embodiments described and illustrated herein.

Embodiments of the present disclosure are directed to systems and methods for determining the viewing direction of a user, such as the driver of a vehicle. Driver monitoring systems may track the gaze of a driver for a variety of purposes. As a non-limiting example, a driver monitoring system may track the gaze of a driver (i.e., the viewing direction of a user) to determine whether or not the driver sees an object in the environment. In some case, the driver should avoid an object, such as a pedestrian. If the driver does not see the object, an accident may occur. If the driver monitoring system determines that driver has not seen the object, the vehicle computer may take control of the vehicle to avoid the object.

The driver monitoring system may determine the viewing direction of the user by monitoring the eyes of the user. For example, a driver facing sensor, such as an IR sensor, monitors one or more eyes of the user to determine one or more eye angles in three dimensions. Based on the eye angles, a viewing direction of the user can be determined. When a viewing direction of the user intersect with an object detected by the vehicle in the environment, it may be assumed that the user has seen the object. When the viewing direction of the user does not intersect with the object over a certain period of time, it may be assumed that the user has not seen the object.

However, the spatial location of the user's eyes in three dimensional space is unknown. Therefore, a viewing direction of the user in isolation may not be enough information to determine whether or not a user has seen an object in the environment. For example, the driver may turn his or her left or right, or may move his or her head around in the cabin in three dimensional space. Such movement causes uncertainty as to the true viewing direction of the user.

Embodiments of the present disclosure are directed to systems and methods for determining the viewing direction of the user by establishing the spatial location of the eyes of the user in three dimensional space. With the spatial location of the eyes of the user known, as well as the eye angle(s) of the user, the viewing direction of the user may be determined. Thus, in some embodiments, it may be determined whether or not a user sees an object in the environment.

Generally, embodiments include one or more markers deployed within the vehicle that may be invisible to the user but detectable by a first sensor associated with the user. Embodiments derive the location of the user's head and eyes in three dimensional space based on the location of the marker as detected by the sensor. Additionally, the eye angle of the user is detected using a second sensor having the eyes of the user (or single eye in some embodiments) in its field of view. The eye angle of the user's eyes provide information regarding the direction of a user's gaze. Further, the spatial location of the user's eyes provide a starting location for the viewing direction of the user's eyes. Using a combination of both the spatial location of the user's eyes and head, and the eye angle of one or more of the user's eyes, the true viewing direction can be determined. Thus, the embodiments are more accurate at determining the viewing direction and also whether or not a user sees an object in the environment over previous systems because the spatial location of the user's eyes and head is determined.

Various embodiments of systems and methods for determining a viewing direction of a user are described in detail below.

FIG. 1 generally depicts an example vehicle 10 comprising an example system 100 for detecting a viewing direction of a user (i.e., a driver monitoring system 100). The system 100 is configured to detect both a spatial location of the head 22 and/or eye(s) 24 of a user in three dimensional space, as well as an eye angle of one or more eyes 24 of the user 20 to determine a viewing direction of the user 20. From the viewing direction, the system 100 (or some other vehicle system or component receiving data from the system) may determine whether or not the user 20 has seen an object in the environment of the vehicle 10.

Although embodiments herein are described in the context of identification systems for automotive vehicles, embodiments are not limited thereto. For example, the viewing direction systems and methods described herein may be configured and compatible for use with various transportation systems, including, for example, motorcycles, bicycles, watercrafts, aircrafts, and/or the like. Other uses beyond vehicle operation should generally be understood and are included within the scope of the present disclosure.

FIG. 1 shows an example coordinate system that is used for illustrative purposes only. In the example coordinate system, the +Y/−Y direction is up and down with respect to the vehicle, the +X/−X direction is forward and backward with respect to the vehicle, and +Z/−Z is left and right with respect to the vehicle. It should be understood that embodiments are not limited by the illustrated coordinate system and it is used merely for convenience and ease of description.

The example system shown in FIG. 1 generally includes at least one marker 102 disposed within the vehicle 10 and an optical assembly 110 that is worn by, or otherwise associated with, the user 20. The marker 102 may be visible or invisible to the user 20. In the case of an invisible marker 102, as a non-limiting example, the marker 102 may be configured to reflect and/or emit infrared (IR) radiation. For example, the marker 102 may be made of an ink that reflect IR light. As another example, the marker 102 may be a device that emits IR light. The marker 102 may be any shape discernable to the optical assembly 110. As a non-limiting example, the marker 102 may be configured as a QR code or a bar code.

The marker 102 may be attached directly to the windshield 14 of the vehicle. For example, the marker 102 may be a transparent sticker having IR reflective ink that is attached to an interior surface of the windshield 14. In other embodiments, such as is shown in FIG. 1, the marker 102 may be configured to be reflected off of the windshield 14 of the vehicle 10 such that a reflection 102' of the marker 102 is viewable by the optical assembly 110 rather than the marker 102 itself. As a non-limiting example, the marker 102 may be configured as a device that emits or otherwise projects an IR image onto the windshield such that the reflection 102' of the marker 102 is viewable by the optical assembly 110. To enhance IR reflection of the marker 102, the an IR reflective film may be attached to an interior surface of the windshield 14.

The marker 102 should establish a reference location in three-dimensional space within the vehicle 10 for detection by the optical assembly 110. In other words, the data generated by the optical assembly 110 uses the location of the marker 102 to establish the position of the optical assembly 110 and thus the location of the user's head and/or eyes.

In the illustrated example, the optical assembly 110 is configured as glasses worn by the user 20. However, the optical assembly 110 may be configured as other devices, such as a headband, a hat, a necklace, and the like. Whatever the configuration, the location of the eyes 24 of the user with respect to the first sensor 114 (described below and shown in FIG. 2) should be known and may be established by a calibration process. In the case of the optical assembly 110 being configured as glasses as shown in FIG. 1, no calibration process may be needed because the glasses are worn over the eyes of the user. However, when the optical assembly 110 is configured as another device, such as a headband, the location of the first sensor 114 with respect to the user's eyes 24 should be established for accurate determination of the user's eyes within three dimensional space.

Figure 2A:
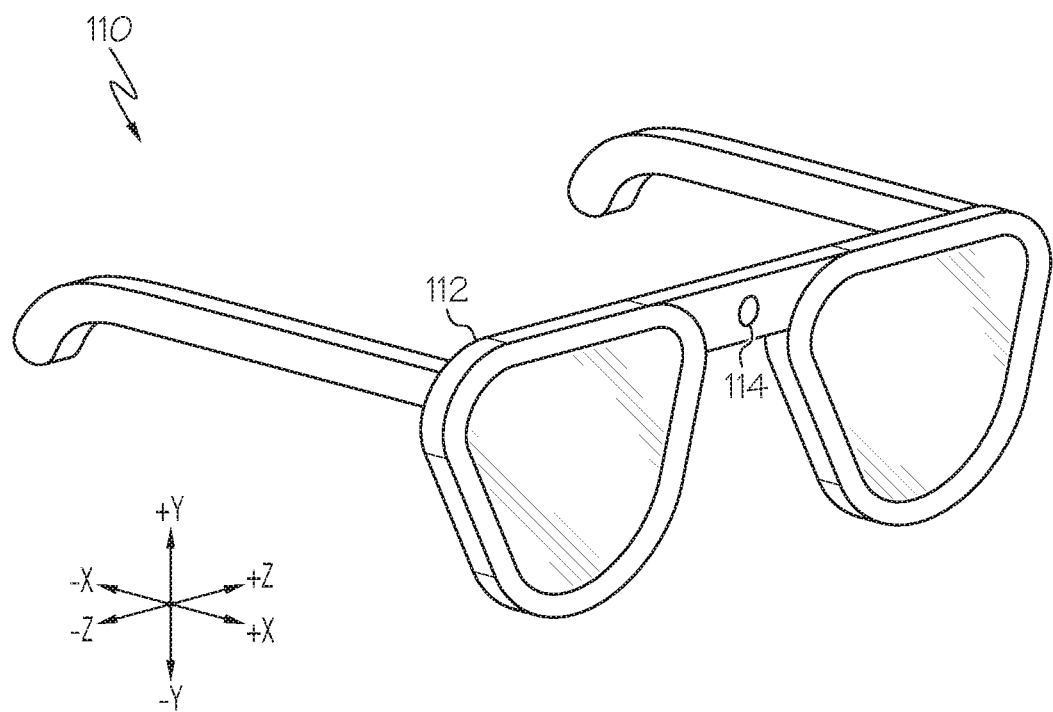
FIG. 2A schematically depicts a front perspective view of an example optical assembly configured as glasses according to one or more embodiments described and illustrated herein.
Figure 2B:
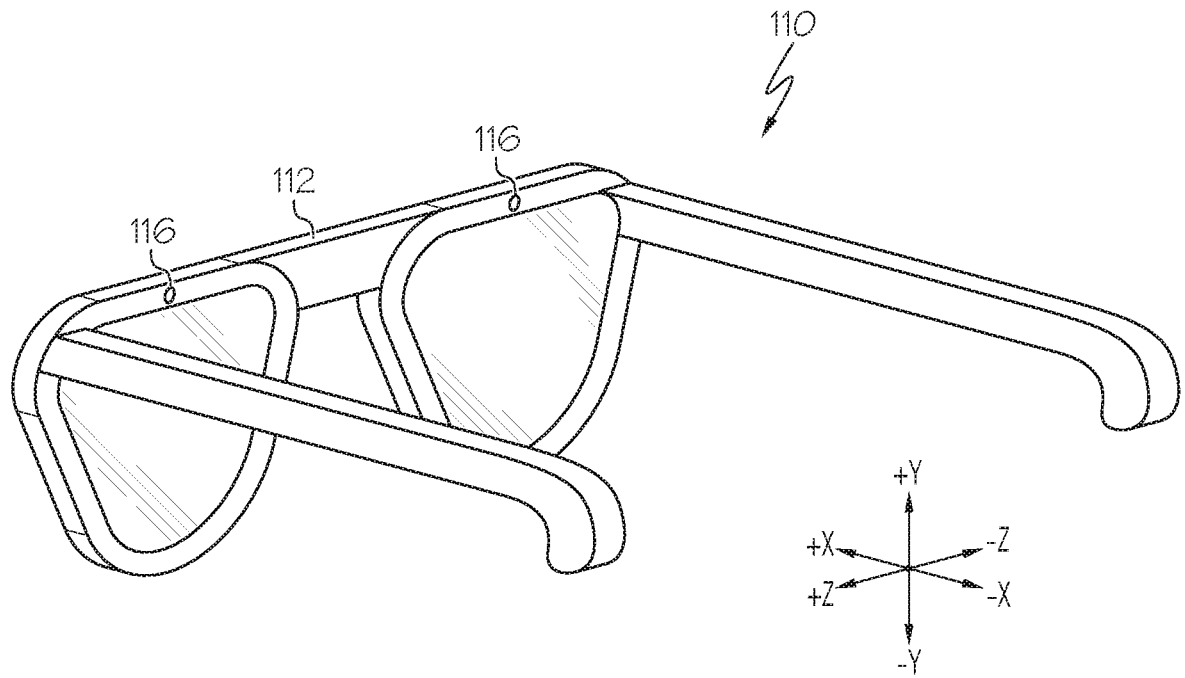
FIG. 2B schematically depicts a rear perspective view of an example optical assembly configured as glasses according to one or more embodiments described and illustrated herein.

FIGS. 2A and 2B illustrate an example optical assembly 110 configured as glasses. The optical assembly 110 generally comprises a frame 112, a first sensor 114 within or attached to a forward face of the frame 112 (i.e., facing the +X direction toward the marker 102 of FIG. 1), and two second sensors 116 on a back face of the frame 112 (i.e., facing the −X direction toward the user's eyes 24 as shown in FIG. 1). Any number of first sensors 114 and second sensors 116 may be provided. As an example and not a limitation, one second sensor 116 may be provided for each eye as shown in FIGS. 2A and 2B.

It is noted that the second sensors 116 may not be disposed within the frame of the optical assembly, but rather may be positions elsewhere in the vehicle 10. As a non-limiting example, one or more second sensors 116 may be positioned on a dashboard 12 of the vehicle 10 and have a field of view toward the eyes 24 of the user 20.

The first sensor 114 may be an IR sensor that is operable to detect light in the IR wavelength band. As shown in FIG. 1, the location of the marker 102 is such that the marker 102 or the reflection 102' of the marker is within the field of view of the first sensor 114. Any known or yet-to-be-developed IR sensor may be utilized. In some embodiments, the first sensor 114 may also have depth detection capabilities (e.g., a depth sensor) to more accurately determine a distance the first sensor 114 is from the marker 102, or a reflection 102' of the marker 102. In other embodiments, the distance of the first sensor 114 to the marker 102 or the reflection 102' of the marker 102 is calculated using image data from the IR sensor only by using any known or yet-to-be-developed depth calculation technique. In some embodiments, two first sensors 114 are provided to create a stereo image from which depth of the marker 102 is calculated. Although embodiments are described as using IR sensors, sensors capable of detecting radiation in the visible spectrum may also be utilized, particularly, in cases where the marker 102 is visible to the user 20.

The one or more second sensors 116 may be configured as any known or yet-to-be-developed eye tracking sensors. For example, the one or more second sensors 116 may be IR eye tracking sensors that detect the pupil of the eyes 24 of the user 20.

Figure 3A:
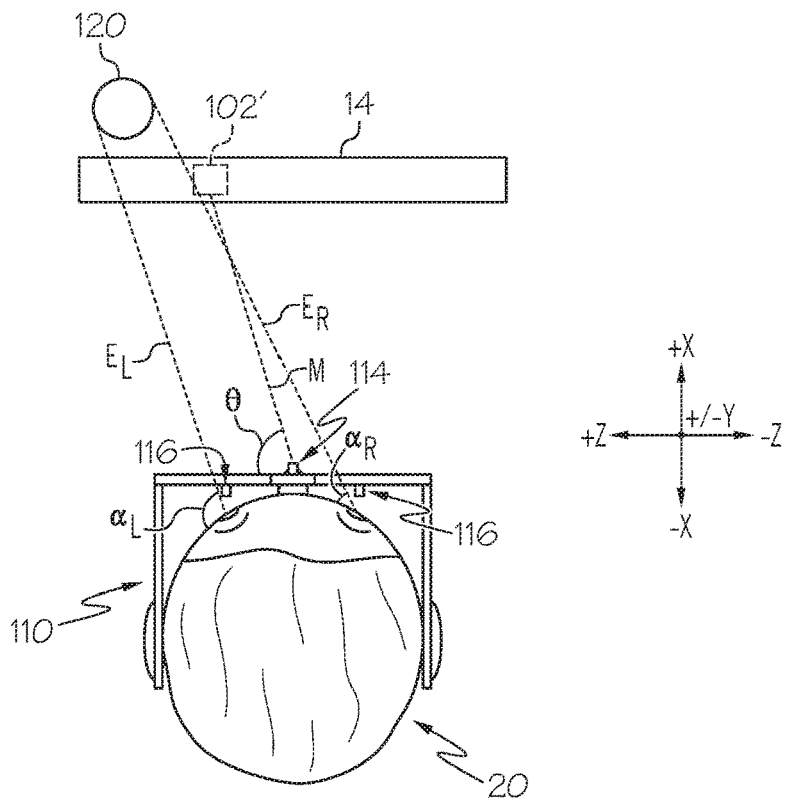
FIG. 3A schematically depicts a user looking out of a windshield at an object at a first location and an example system for determining a viewing direction of the user according to one or more embodiments described and illustrated herein.

Referring now to FIG. 3A, a user 20 viewing an object 120 through a windshield of a vehicle 10 is schematically illustrated. A reflection 102' of a marker 102 is visible to the first sensor 114 of the optical assembly 110 worn by the user 20. As stated above, in other embodiments the marker 102 itself may be disposed directly on the windshield 14. The reflection 102' of the marker 102 is within the field of view of the first sensor 114. The reflection 102' of the marker 102 is detected by the first sensor 114. As a non-limiting example, image data including a representation of the reflection 102' of the marker 102 is provided to a processor that determines the location of the reflection 102' of the marker 102 in three-dimensional space.

As shown in FIG. 3A, an imaginary line M connecting the first sensor 114 to the reflection 102' of the marker 102 is shown. An angle θ between the imaginary line M and the X-axis is also shown. Angles between the imaginary line M and the Y- and Z-axes are also determined to determine the location of the reflection 102' of the marker 102 in three-dimensional space. As stated above, the first sensor 114 may also include a depth detector, or the distance between the reflection 102' of the marker 102 may be calculated using only image data provided by the first sensor 114. In another non-limiting example, the depth calculation may be enhanced by providing two first sensors 114 to produce stereo images to calculate depth. In all cases, data from the first sensor 114 is used by the processor to calculate a location of the reflection 102' of the marker 102 (or the marker 102 itself) with respect to the first sensor 114. As stated above, the reference location of the reflection 102' of the marker 102 is used to establish the position of the optical assembly 110 and therefore the eyes 24 of the user 20.

Still referring to FIG. 3A, the user 20 is depicted as gazing at an object 120. A processor may use data from the second sensors 116 to detect the eye angle of the left and right eyes by any known or yet-to-be-developed method. Imaginary line $E_L$ connects the user's left eye to the object 120 and represents a viewing direction of the left eye of the user 20. Imaginary line $E_R$ connects the user's right eye to the object 120 and represents a viewing direction of the right eye of the user 20. FIG. 3A illustrates a left eye angle $\alpha_L$ between imaginary line $E_L$ and the X axis and a right eye angle $\alpha_L$ between imaginary line $E_R$ and the X axis. However, it should be understood that eye angles for both the left and right eyes between the respective imaginary lines $E_L$ and $E_R$ and the Y- and Z-axes may also be determined but are not shown in FIG. 3A.

If the system is not aware of the location of the head 22 and/or eyes 24 of the user 20, the system may not be able to ascertain whether or not the user is looking at an object. However, because the system 100 knows the location of the head 22 and/or eyes 24 of the user 20, and thus the origin of the imaginary lines $E_L$ and $E_R$, the system 100 knows the location of the viewing direction of the user in three dimensional space. Using external vehicle sensors (e.g., camera sensors, lidar sensors, and/or the like), the system 100 knows the location of the object 120 in the environment of the vehicle 10. Accordingly, knowing the location of the object 120 and the precise viewing direction of the user 20, the system determines whether or not the user has seen the object 120. If the system 100 determines that the user 20 has not seen the object 120 and it is imperative that the user react to avoid the object, the system may take over control of the vehicle 10 to control the vehicle to avoid the object 120. In another example, the system 100 may present a warning to the user 20 regarding the object 120.

Figure 3B:
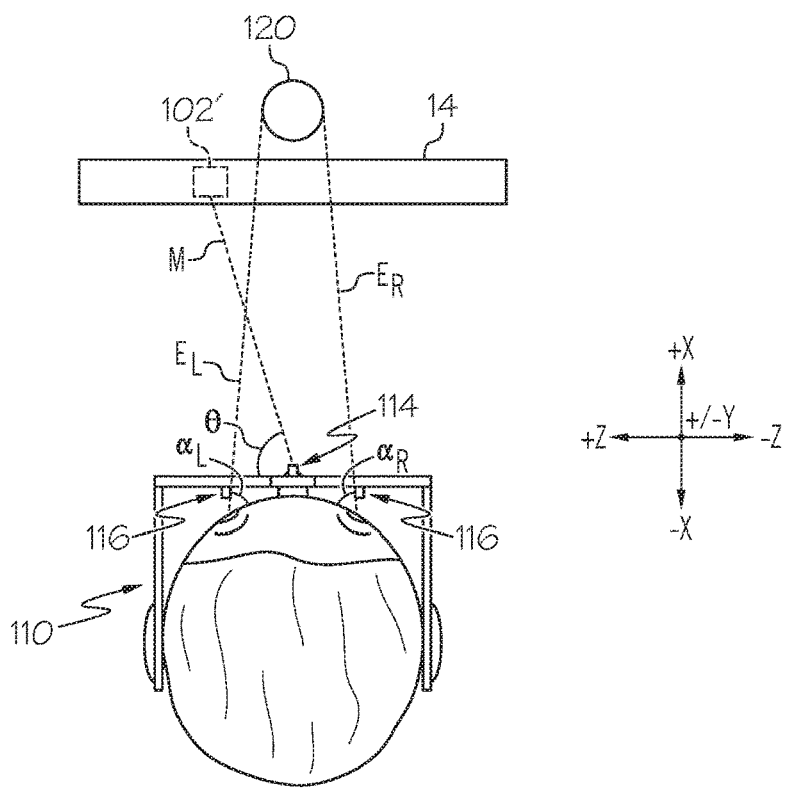
FIG. 3B schematically depicts a user looking out of a windshield at an object at a second location and an example system for determining a viewing direction of the user according to one or more embodiments described and illustrated herein.

FIG. 3B is similar to FIG. 3B but the object 120 is at a different location with respect to the user 20. In this example, the left eye angle $\alpha_L$ between imaginary line $E_L$ and the X axis and the right eye angle $\alpha_L$ between imaginary line $E_R$ and the X axis is different from that of FIG. 3A.

Figure 4:
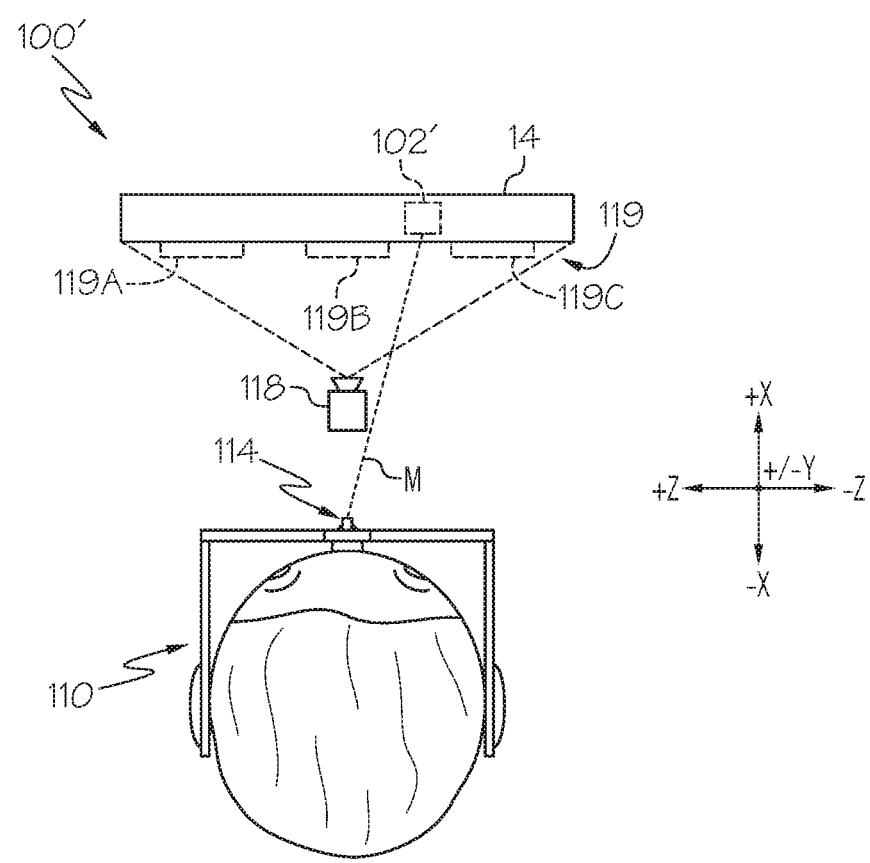
FIG. 4 schematically depicts a user looking out of a windshield and an example system for determining a viewing direction of the user and for projecting augmented reality content according to one or more embodiments described and illustrated herein.

Referring now to FIG. 4, in some embodiments, an example system 100' may further include a projector 118 configured to project augmented reality content 119 to the user 20. The projector 118 may be a component of the glasses defining the optical assembly 110 such that the glasses are configured as augmented reality glasses. In another example, the projector 118 may be a heads-up display that is operable to project augmented reality content onto the windshield 14 of the vehicle 10.

The augmented reality content is projected in accordance with the known location of the head 22 and/or eyes 24 of the user 20 (which is determined by the method described above) as well as the eye angles of the eyes 24 of the user 20. Because the location of the head 22 and/or eyes 24 of the user 20 are known, the location of the augmented reality content may be more accurately presented to the user. For example, the augmented reality content may include icons or object representations (illustrated by augmented reality content 119A, 119B, 119C) that are overlaid on the view through the windshield 14. The augmented reality content may be arrows or other directional indicators shown in the street, representations of other cars or objects, signs, and the like. These object representations may be accurately placed in the augmented reality projection because the location of the user's head 22 and/or eyes 24 is known. In a non-limiting example, a passenger may also be wearing an optical assembly 110 configured as glasses, and the augmented reality presented by the passenger's optical assembly 110 will be projected from the perspective of the passenger because the location of the passenger's head may be determined using the marker 102 as described above.

Figure 5:
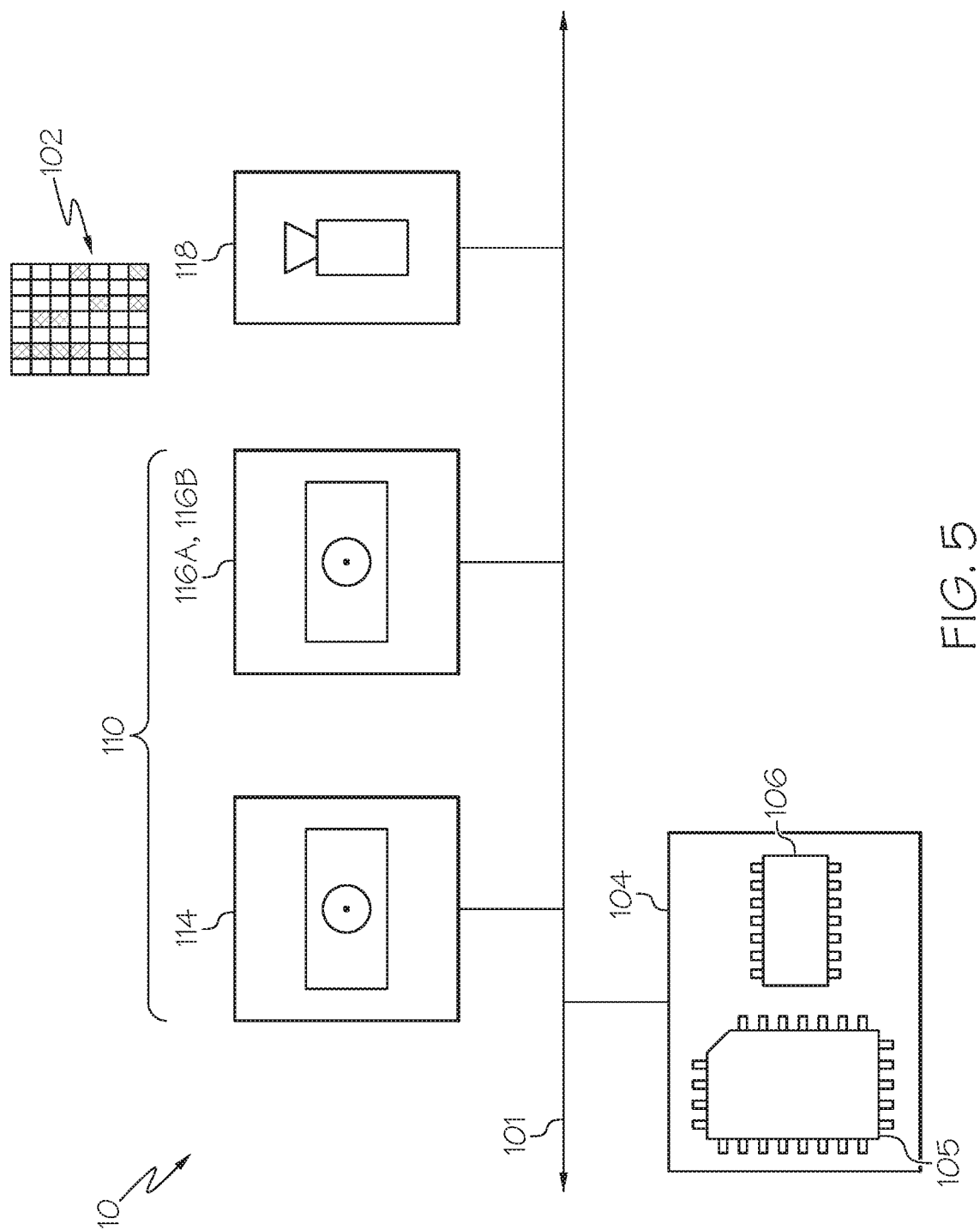
FIG. 5 schematically depicts communicatively coupled components of the vehicle of FIG. 1 according to one or more embodiments shown and described herein.

Referring now to FIG. 5, a schematic diagram illustrating communication between various components of the vehicle 10 including a system 100 as described above is depicted. The vehicle 10 generally includes a communication path 101, an electronic controller 104, and a system 100 including one or more first sensors 114, one or more second sensors 116, and, in some embodiments, a projector 118. The example system 100 further includes one or more markers 102 placed in the vehicle 10.

The communication path 101 that provides data interconnectivity between various modules disposed within the vehicle 10. Specifically, each of the modules can operate as a node that may send and/or receive data. In some embodiments, the communication path 101 includes a conductive material that permits the transmission of electrical data signals to processors, memories, sensors, and actuators throughout the vehicle 10. In another embodiment, the communication path 101 can be a bus, such as for example a LIN bus, a CAN bus, a VAN bus, and the like. In further embodiments, the communication path 101 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The electronic controller 104 is any type of control device, which is capable of selectively controlling operation of the one or more first sensors 114, the one or more second sensors 116, the projector 118 and any other vehicle component. For example, the electronic controller 104 may include one or more processors 105 and one or more memory modules 106. The one or more processors 105 may include any device capable of executing machine-readable instructions stored on a non-transitory computer-readable medium. Accordingly, each processor 105 may include a controller, an integrated circuit, a microchip, a computer, and/or any other computing device.

The one or more memory modules 106 are communicatively coupled to the one or more processors 105 over the communication path 101. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle 10 and/or external to the vehicle 10. The one or more memory modules 106 may be configured to store one or more pieces of logic, as described in more detail below. The embodiments described herein may utilize a distributed computing arrangement to perform any portion of the logic described herein.

Embodiments of the present disclosure include logic stored on the one or more memory modules 106 that includes machine-readable instructions and/or an algorithm written in any programming language of any generation (e.g., 1GL, 2GL, 3GL, 4GL, and/or 5GL) such as, machine language that may be directly executed by the one or more processors 105, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 allows the electronic controller 104 to receive first data from the first optical sensor, wherein the first data includes a representation of the marker, receive second data from the second optical sensor, wherein the second data includes a representation of an eye of the user, determine a spatial location of the optical assembly with respect to the marker from the first data, determine an eye angle of the eye of the user from the second data, and determine a viewing direction of the user from the spatial location of the optical assembly and the eye angle of the eye of the user. The logic stored on the one or more memory modules 106 may be configured to control the one or more processors 105 to perform any of the functionalities described herein.

It should now be understood that embodiments described herein are directed to systems and methods that use both head location and eye angle to accurately determine a viewing direction of a user, such as a driver or a passenger of a vehicle. The system determines the location of the user's head and eyes by determining the position of one or more markers in the vehicle using a sensor that detects the one or more markers. By knowing the location of the user's head and eyes with respect to the one or more markers, the system determines the location of the user's head and eyes within the vehicle. One or more eye tracking sensors track the eye angle of one or both eyes of the user. The system uses the combination of the head and eye position with the eye angle to calculate the viewing direction of the user. The viewing direction of the user can be used in a wide variety of applications and functions. As one non-limiting example, the viewing direction of the user can be used to determine whether or not a driver have seen an object in the environment. If not, the system may determine that the situation warrants autonomous control of the vehicle to avoid the object.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A system for detecting a viewing direction of a user, comprising:
   an infrared (IR) reflective film configured to be attached to a surface;
   a device that projects a marker in IR light at a fixed location on the IR reflective film;
   an optical assembly, comprising:
   a first optical sensor arranged to view the marker; and
   a second optical sensor arranged to view the user;

a processor; and a non-transitory computer-readable medium storing computer-readable instructions, that, when executed by the processor, cause the processor to:

receive first data from the first optical sensor, wherein the first data includes a representation of the marker;

receive second data from the second optical sensor, wherein the second data includes a representation of an eye of the user;

determine a spatial location of the optical assembly with respect to the marker from the first data;

determine the eye angle of the eye of the user from the second data; and determine the viewing direction of the user from the spatial location of the optical assembly and the eye angle of the eye of the user.

2. The system of claim 1, wherein the IR reflective film is configured to be arranged directly on a windshield of a vehicle.

3. The system of claim 2, wherein:

the device is configured to be arranged on a dashboard of a vehicle;

the first optical sensor is configured to view a reflection of the marker in the windshield of the vehicle.

4. The system of claim 1, wherein the first optical sensor is an IR sensor for detecting the marker.

5. The system of claim 1, wherein the optical assembly is configured to be worn on a head of the user.

6. The system of claim 1, wherein the second optical sensor is an IR sensor for tracking the eye angle of the user.

7. The system of claim 1, wherein the optical assembly comprises a projector configured to produce augmented reality content viewable by the user based on the spatial location of the optical assembly.

8. A system for detecting a viewing direction of a user within a vehicle, the system comprising:

an infrared (IR) reflective film configured to be attached to a windshield of the vehicle;

a device that projects a marker in IR light at a fixed location on the IR reflective film, wherein the marker is invisible to the user;

an optical assembly configured to be arranged over the eyes of the user, the optical assembly comprising a first optical sensor arranged to view the marker and a second optical sensor arranged to view the user;

a processor; and a non-transitory computer-readable medium storing computer-readable instructions, that, when executed by the processor, cause the processor to:

receive first data from the first optical sensor, wherein the first data includes a representation of the marker;

receive second data from the second optical sensor, wherein the second data includes a representation of an eye of the user;

determine a spatial location of the optical assembly with respect to the marker from the first data;

determine an eye angle of the eye of the user from the second data; and determine a viewing direction of the user from the spatial location of the optical assembly and the eye angle of the eye of the user.

9. The system of claim 8, wherein the optical assembly comprises a projector configured to produce augmented reality content viewable by the user based on the spatial location of the optical assembly.

10. The system of claim 9, wherein the augmented reality content includes directional indicators.

11. The system of claim 8, wherein the second optical sensor is for detecting the eye angle of the user.

12. The system of claim 8, wherein the marker is a QR code.

13. A vehicle comprising:

a windshield;

an infrared (IR) reflective film attached to the windshield;

a device that projects a marker in IR light at a fixed location on the IR reflective film such that the marker is viewable on the windshield;

an optical assembly configured to be arranged on a head of a user, the optical assembly comprising:

a first optical sensor arranged to view the marker; and a second optical sensor arranged to view an eye of the user;

a processor; and a non-transitory computer-readable medium storing computer-readable instructions, that, when executed by the processor, cause the processor to:

receive first data from the first optical sensor, wherein the first data includes a representation of the marker;

receive second data from the second optical sensor, wherein the second data includes a representation of the eye of the user;

determine a spatial location of the optical assembly with respect to the marker from the first data;

determine an eye angle of the eye of the user from the second data; and determine a viewing direction of the user from the spatial location of the optical assembly and the eye angle of the eye of the user.

14. The vehicle of claim 13, wherein the optical assembly comprises a projector configured to produce augmented reality content viewable by the user based on the spatial location of the optical assembly.

15. The vehicle of claim 13, wherein the first optical sensor is an IR sensor for detecting the marker.

16. The vehicle of claim 15, wherein the second optical sensor is an IR sensor for tracking the eye angle of the user.

* * * * *